Nov. 25, 1958  M. H. THORNTON  2,861,496
GLARE SHIELDING STRUCTURE
Filed June 17, 1954  2 Sheets-Sheet 1
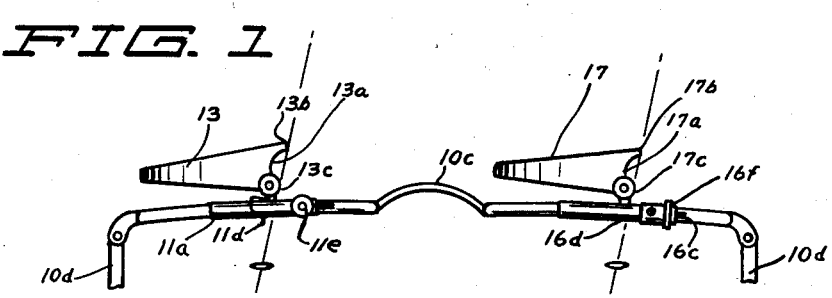
FIG. 1
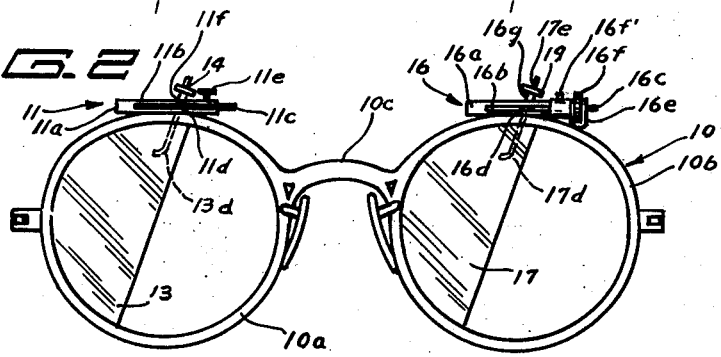
FIG. 2
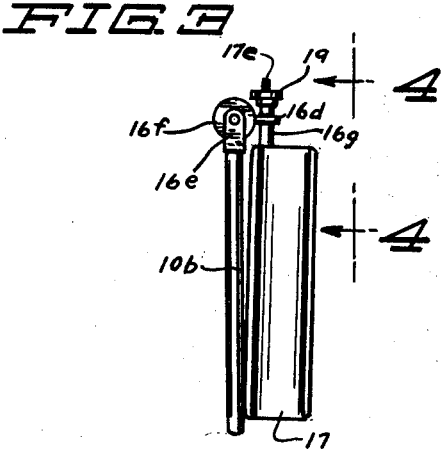
FIG. 3
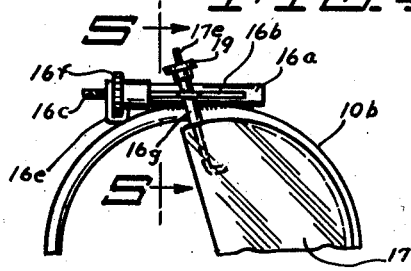
FIG. 4
FIG. 5
INVENTOR.
MATHEW H. THORNTON
BY Chas. C. Reif
ATTORNEY Nov. 25, 1958 M. H. THORNTON 2,861,496
GLARE SHIELDING STRUCTURE
Filed June 17, 1954 2 Sheets-Sheet 2
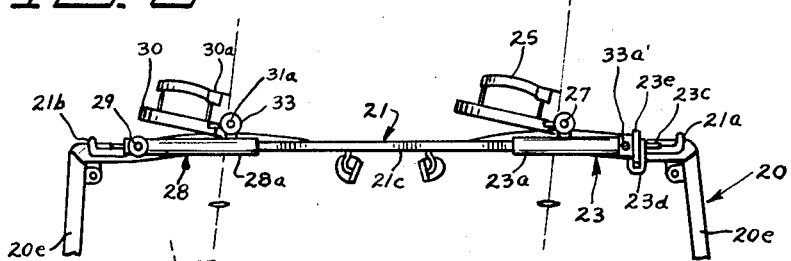
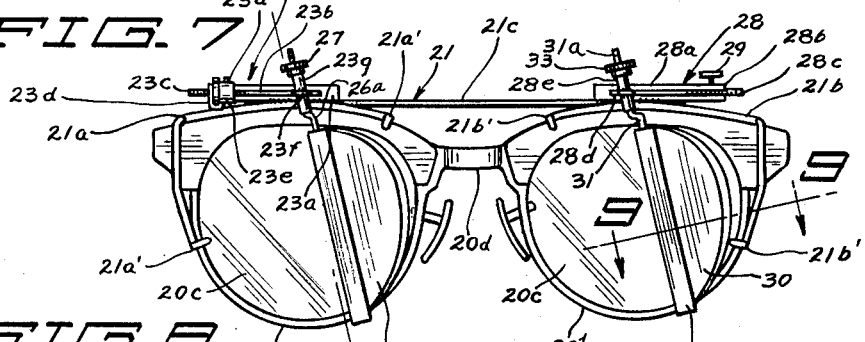
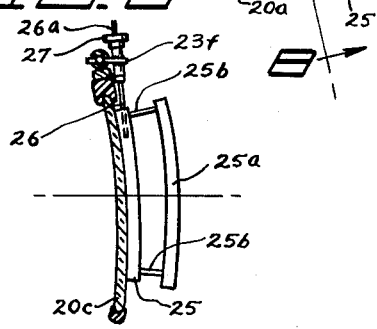
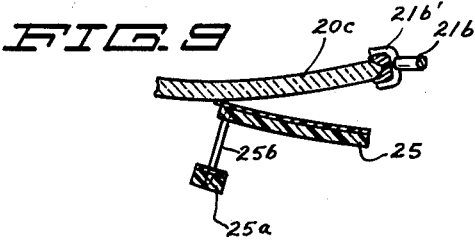
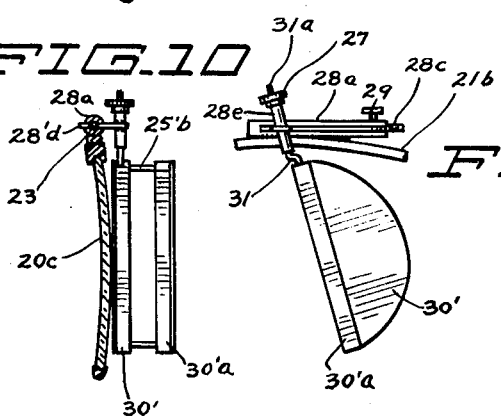
INVENTOR.
MATHEW H. THORNTON
BY
ATTORNEY

United States Patent Office 2,861,496
Patented Nov. 25, 1958

2,861,496

GLARE SHIELDING STRUCTURE

Mathew H. Thornton, St. Paul, Minn.

Application June 17, 1954, Serial No. 437,422

6 Claims. (Cl. 88—41)

This invention relates to a device for shielding the eyes of a driver of an automobile from a glare of the headlights of an approaching automobile. It is well known that there is an objectionable glare from the headlights of an approaching automobile, particularly when the headlights of such an automobile are on high beam. Such glare tends to be particularly blinding just before the point is reached at which the automobiles pass one another. It is desirable to have some means for preventing or blocking such glare from disturbing the vision of drivers at such times.

It is an object of this invention to provide a novel and efficient device for shielding the eyes of a driver of an automobile from the objectionable glare of headlights of an approaching automobile by blocking out such glare which on U. S. highways will come from the left side of the driver.

It is another object of this invention to provide an improved device comprising a portion of non-transparent material which will prevent the passage of some or all light and which will be supported in front of one or both eyes of the driver of an automobile, the same being of a size to vary the vision of the driver on only the left-hand side of the road so that the right-hand side of the road can be clearly observed.

It is a further object of this invention to provide a device comprising a member of non-transparent material having a portion with spaced straight line edges which will be supported in front of a wearer's vision, and means for simultaneously positioning said edges to form a sharp dividing line in the wearer's vision to distinguish between what is seen at one side of said line and what is blocked out by said non-transparent portion at the other side of said line.

It is more specifically an object of this invention to provide a device comprising an elongated supporting member, a second member arranged for sliding movement longitudinally thereof, means on said supporting member for moving said last mentioned member longitudinally thereof, a third member of non-transparent material pivotally connected to said member to be swingable about an axis substantially parallel to the plane of said third member, said non-transparent member having a portion with spaced straight line edges at one side thereof, and means for moving said third members about said axis for positioning said spaced edges to form a sharp dividing line in the wearer's vision whereby said sharp dividing line will distinguish between what is clearly seen to the right thereof and what is blocked out by said semi-transparent members to the left thereof.

These and other objects and advantages of the invention will be fully set forth in the following description made in connection with the accompanying drawings in which like reference characters refer to similar parts throughout the several views and in which:

Fig. 1 is a view of applicant's device in side elevation with some parts broken away;

Fig. 2 is a plan view of applicant's device with some parts shown in dotted lines;

Fig. 3 is a top plan view of a portion of applicant's device showing a part thereof in dotted lines;

Fig. 4 is a partial view in front elevation taken on line 4—4 of Fig. 3, as indicated by the arrows;

Fig. 5 is a view in elevation of a broken away portion of applicant's device showing a part thereof in vertical section taken on line 5—5 of Fig. 4, as indicated by the arrows;

Fig. 6 is a view in side elevation of a modification of applicant's device with some parts broken away;

Fig. 7 is a view in front elevation of said modification of applicant's device;

Fig. 8 is a view taken on line 8—8 of Fig. 7, with a portion in vertical section and a portion in elevation;

Fig. 9 is a view taken in horizontal section on line 9—9 of Fig. 7, as indicated by the arrows, with some parts broken away;

Fig. 10 is a view similar to the view shown in Fig. 8 showing a modification of a portion thereof; and Fig. 11 is a view similar to that shown in Fig. 10 when viewed from a plane at right angles thereto.

Referring to the drawings, and particularly Figs. 1–5, a device is shown carried on a frame 10. Said device may be carried on a numount type of spectacle having only a partial upper portion of a frame adapted to carry a pair of lens or a regular frame type of spectacle having a pair of lens openings therein. In the embodiment of the invention here illustrated, a pair of spectacles is shown comprising said frame 10, the usual lens openings 10a and 10b, a nose piece 10c and bows 10d. Said frame may be made of suitable substantially rigid material, such as rubber compound, plastic, or metal. In the present embodiment, said frame is disclosed as a metal frame. Secured to the top central portion of the frame 10 over the lens opening 10a, as by soldering or welding, is a supporting member 11. Said supporting member 11 comprises a tubular portion 11a having a longitudinally extending slot 11b therethrough which extends substantially the full length thereof. A rod 11c of small dimension is disposed in said tube 11a for movement longitudinally thereof. A lug 11d is secured to said rod 11c and extends outwardly forwardly of said member 10 through said slot 11b. A set screw 11e is provided threaded into the top of member 11a and is adapted to hold said member 11c in any desired position longitudinally of member 11a. A tubular member 11f of short length is secured at its central portion to said lug 11d extending above and below thereof, and the same is here shown as being inclined at an angle to the central vertical axis of said lens opening. A glare shield member 13 lens-like in form is provided which may be made of any suitable non-transparent material, and preferably is of size which will be a substantial portion of said lens opening. Said member 13 is here disclosed as being formed as a segment of non-transparent plastic material having a rectilinear edge portion of substantial thickness. Said edge portion is here shown as being substantially U-shaped in horizontal cross section forming a recess 13a and spaced edges 13b and 13c along said recess. A bracket 13d is provided, the lower portion of which is imbedded in and secured to said member 13, and the upper portion of which extends through said member 11f carried in member 11d. The upper end portion of said member 13d is threaded and a nut 14 having a small knurled wheel is disposed on said threaded portion whereby said member 13 may be turned to any desired position about the axis of member 13d and held in said position by being clamped against member 11f by nut 14.

A supporting member 16 similar to member 11, is secured, as by soldering or welding, to the top central portion of the part of frame 10 over said lens opening 10b. Said member 16 comprises a tubular portion 16a having a longitudinally extending slot 16b horizontally therethrough substantially the full length thereof. A rod 16c having a threaded outer end portion is disposed in said member 16a. Rod 16c has a lug 16d secured to the central portion thereof and extending outwardly forwardly through said slot 16b. A short tubular member 16g is secured in said lug 16f at its central portion and is positioned to be parallel to said member 11f. A bracket 16e is secured to member 16 by a small set screw 16f' and has a reversely bent portion spaced outwardly therefrom with an opening therethrough which supports the outer end of rod 16c. A small hand wheel 16f forming a nut is threaded on rod 16c and is positioned between the parts of bracket 16e and the member 16a. Rod 16c is thus moved longitudinally of member 16a when said hand wheel 16f is rotated. A glare shield member 17 is provided which is similar is structure to said member 13 and having a recess 17a concave in cross section along its straight side whereby spaced edges 17b and 17c are formed. A bracket 17d has a lower portion secured in said member 17 and is here disclosed as being imbedded therein. Said bracket 17d has an upper offset portion which extends through said member 16g. Said member 17d has an upper threaded portion and a small hand wheel 19 forming a nut is threaded on said upper end portion of said member 17d. Nut 19 can be turned to clamp member 17d against member 16g and hold it in the desired position.

With reference to Fig. 2, said members 13 and 17 are shown in operating position and their respective edges 13b—13c and 17b—17c can be moved to form a sharp line in the vision of the wearer. Said edges are here shown inclined at an angle to the central vertical axes of said lens openings 10a and 10b.

In operation, the driver of an automobile will wear applicant's device in the same manner as a pair of glasses are worn. Applicant's device is intended to be worn for night-time driving to obstruct the glare of approaching headlights from interfering with the driver's vision in operating his automobile. Member 13 will be moved about the axis of its rectilinear edge portion to aline spaced edges 13b and 13c so that they will form a sharp line in the vision of the driver's left eye when he is looking straight ahead. Said sharp line will be alined with the left-hand edge of a road with the driver sitting in his normal driving position by moving said member 13 longitudinally of said frame 10 and the same will be locked in position by tightening set screw 11e.

Member 17 will next be adjusted in the vision of the driver's right eye. Member 17 will be moved about the axis of its rectilinear edge portion to the point where spaced edges 17b and 17c will form a sharp dividing line in the vision of the driver's right eye. Said last mentioned dividing line will be alined with the left-hand edge of a road as seen by the driver sitting in his normal driving position by moving said member 17 by rotation of said hand wheel 16f. This adjustment will bring the sharp dividing lines formed by said edges 13b—13c and 17b—17c into focus in the driver's vision as a single common sharp line of division between what is seen by the driver to the right of said common dividing line and what is obstructed by said non-transparent members 13 and 17 respectively to the left of said common dividing line. Thus the driver's normal driving vision when he is in his normal driving position is unobstructed and he has full and complete vision of the entire road before him. When a car approaches, to avoid the glare of approaching headlights, the driver will turn his head slightly to the right so that said sharp dividing lines focused into a common dividing line will be moved to the right to be alined with the center of a road instead of the left-hand edge portion of a road. The glare of an approaching automobile will be directed from the left of the driver where the driver is on the right-hand side of a road so that said non-transparent members 13 and 17 will obstruct said glare and will block it to prevent it from interfering with the vision of the driver. The driver will retain clear and unobstructed vision of the right-hand side of the road, which is the portion of the road in which he will be driving his own automobile. It has been found in practice that said sharp dividing lines focused into a common dividing line distinguish clearly between what is seen without obstruction to the right and what is obstructed or blocked from interfering with a driver's vision by said non-transparent members to the left. Thus with a slight movement to the right of his head the operator can easily and effectively avoid and block out the glare of approaching headlights and can safely and conveniently operate his own vehicle by having clear unobstructed vision in his driving lane.

Referring to Figs. 6–9, a modification of applicant's device is disclosed. Applicant's modified device is adapted to be worn as an attachment on an ordinary pair of spectacles, such as the rimless, numount or frame type of spactacles, and is adapted for use for persons who wear glasses. In the embodiment of the invention here illustrated, a spectacle frame 20 is shown having lens openings 20a and 20b, lens 20c, a bridge portion 20d and bows 20e.

A frame 21 is provided comprising a pair of clamping members 21a and 21b formed to have a portion respectively overlie the upper portions of said frame 20 over said lens openings 20a and 20b and having portions extending downwardly substantially at right angles to said upper portions about the outer sides of said frame. Clips 21a' and 21b' are secured at the end portions of members 21a and 21b to grip edge portions of said frame 20. A member 21c connects members 21a and 21b at their adjacent portions to hold them in spaced relation and to form a somewhat flexible spacing member. Said members 21a and 21b are here disclosed as being made of substantial rigid wire material. Said member 21c is here disclosed as being made of a flat strip of somewhat flexible spring material. A member 23 comprises a tubular portion 23a having a longitudinally extending slot 23b horizontally therethrough for substantially the full length of said member 23a. Disposed in said member 23a is a member 23c forming a rod and having a threaded portion which extends outwardly of said member 23a. A bracket 23d is secured to the outer end of said member 23a by a set screw 23a' and the outer end of said member 23c extends therethrough. A hand wheel 23e is disposed on said member 23c. Said member 23c is thus movable longitudinally of said member 23a by the rotation of said hand wheel. Secured to said member 23c and extending forwardly therefrom is a lug 23f. A short tubular member 23g is secured to said lug at its central portion and is inclined at an angle to the perpendicular axis of said lens opening 20a. As here shown, said member 23g is inclined downwardly to the left as seen by the operator.

A member 25 is provided and is here disclosed as being formed as a concave-convex segment of non-transparent material of small thickness. Said member 25 is here shown as having a curvature similar to that of the lens in said frame 20. Said member 25 may be made of any suitable material and is preferably made of non-transparent plastic material and if desired, such material may be coated or impregnated with color. Spaced outwardly from the rectilinear edge portion of said member 25 at a right angle thereto and in alinement with said edge portion is a narrow strip 25a. Said member 25a is made of the same material as said member 25 and is held in spaced relation to said member 25 by spacing members 25b. Thus said member 25 is provided with a pair of spaced edges at its straight line edge portion. A bracket 26 has its lower end portion secured in said member 25. Said bracket has an upper offset portion 26a, the upper portion of which is shown as being threaded. Said upper portion of said member 26 extends through said member 23g and a small knurled thumb screw 27 is threaded onto said portion 26a. As here shown, said member 25 is held in operating position at an angle inclined to the perpendicular axis of said lens opening 20a. The offset portion of said member 26 will bear against the lower edge portion of member 23g and said screw 27 will bear against the upper edge portion of said member 23g. Thus said member 25 may be moved about the longitudinal axis of its rectilinear edge portion and held in any desired position by said screw 27.

A member 28 comprising a tubular portion 28a is secured to the upper portion of frame 20 over said lens opening 20b and having a longitudinally extending slot 28b extending horizontally therethrough for substantially the full length thereof. A member 28c forming a rod is disposed in said member 28a. Said member 28c is approximately the same length as said member 28a. A set screw 29 is threaded into the upper outer end portion of said member 28b and extends inwardly thereof to press upon said member 28c to hold the same fixed in any desired longitudinal position. Secured to said member 28c is an outwardly extending lug member 28d formed in the same manner as said member 23f. A short tubular member 28e is provided which is identical to said member 23g and is similarly secured to said member 28d.

A member 30 is provided which is identical in structure to said member 25 having a portion 30a spaced therefrom and formed in the same manner as said member 25a. A bracket 31 identical in structure to said bracket 26 has an upper offset portion 31a and is threaded at its upper end portion. A thumb screw 33 is disposed in said member 31a. Said member 30 will be placed in operating position in the same manner as said member 25.

In operation, applicant's device as disclosed in Figs. 6 through 11 is used in the manner similar to that described above. Said frame member 21 will be disposed or placed on a pair of glasses in the manner as shown in Fig. 7 and will be held securely thereon by said clip members 21a' and 21b'.

Said members 25 and 30 will next be adjusted for use in the same manner as said members 13 and 17, as above described. The same results are obtained with the use of applicant's modified structure as with the structure described in the operation above.

Referring to Figs. 10 and 11, the structure shown is identical in all its parts to parts bearing like characters above described. A modification is shown in member 30'. Said member 30' is identical to said member 25 except that it is flat as is also portion 30a'. Lug 28d' is somewhat longer than said lug 23f to provide clearance between lens 20c and member 30' when the latter is moved about the longitudinal axis of its rectilinear edge portion.

The types of non-transparent members shown in Figs. 1–5, 6–8 and 9–10 may be used interchangeably on the different type spectacle structures shown.

Thus it is seen that I have provided an effective anti-glare shielding device adapted for use by persons who do and who do not wear glasses. Applicant's device is very simple to place in operating position and is very simple to adjust. It provides the driver with clear unobstructed vision for driving his automobile and which by a slight turn of his head to the right very effectively and completely blocks out the glare from approaching headlights. Hence the driver will always have clear unobstructed vision for driving at night by the use of applicant's device, and the discomfort and danger of having his vision interfered with or obstructed by the glare of approaching headlights is completely eliminated. Applicant's device has been fully tested in use and found to be very successful in operation.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A glare shielding device used in connection with a spectacle frame having in combination, a glare shielding lens-like member formed as a segment of non-transparent material having a rectilinear edge portion of substantial thickness, said edge portion being concave in transverse section thus forming a pair of spaced parallel edges, said edges being disposed in substantially a vertical direction, means carried by said frame for holding said member in front of a lens opening in said frame, said means being adapted for swinging said member about an axis extending longitudinally of said edges whereby said member will be swung about said axis to align said spaced edges to form a sharp line in the field of vision through said lens opening, and means on said frame for moving said member longitudinally of said frame.

2. A glare shielding device used in connection with a spectacle frame having in combination, a glare shielding lens-like member of non-transparent material formed to conform to a portion of a lens opening having a rectilinear side of substantial thickness, said side extending substantially in a vertical direction and being concave in transverse section forming a pair of spaced parallel edges, a tubular member carried by said frame longitudinally thereof, a lug movable along said tubular member extending outwardly thereof forwardly of a lens opening, means rotatably securing said shielding member to said lug for rotation of said shielding member about substantially a vertical axis whereby said spaced edges may be aligned to form a sharp line in the field of vision through said lens opening, and means associated with said means for moving said lug longitudinally of said frame.

3. A glare shielding device used in connection with a pair of spectacles having in combination, a frame member adapted to be removably attached to said pair of spectacles, a glare shielding lens-like member of non-transparent material formed as segment having a straight side of substantial thickness, said side extending in a direction somewhat inclined from a vertical direction, said side being concave in transverse section forming spaced parallel edges, means extending longitudinally of said frame for supporting said shielding member in front of a lens opening of said spectacles, means secured to said shielding member adjacent said side thereof for rotation of said shielding member about an axis longitudinal to said side whereby said member may be moved about said axis adjacent said side to align said edges to form a single sharp line in the field of vision through said lens opening, and means carried by said frame for moving said second mentioned means and said shielding member longitudinally of said frame and spectacles.

4. A glare shielding device used in connection with a spectacle frame having in combination, a glare shielding member of non-transparent material formed to conform to a portion of a lens opening in said frame comprising a pair of spaced overlying portions having parallel rectilinear edges extending in a substantially vertical direction, said portion more remote from said lens opening formed as a substantially narrow strip, means carried by said frame for rotatably holding said member adjacent said edges for rotation about substantially a vertical axis in front of a portion of a lens opening in said frame whereby said member may be moved about said axis to align said edges to form a sharp line in the field of vision through said lens opening, and means carried by said frame for moving said member longitudinally of said frame.

5. A glare shielding device used in connection with a spectacle frame having in combination, a member comprising spaced superposed portions of non-transparent material, means on said frame for rotatably holding said member to overlie a portion of a lens opening in said frame and be spaced from said lens opening, said portions having parallel rectilinear edges whereby said member may be rotated to align said edges to form a sharp line in the field of vision through said lens opening, means carried by said frame for moving said member longitudinally of said frame, said first mentioned means comprising a lug supported on said frame for swingably carrying said member in a plane substantially perpendicular to said lug, and means for securing said member in a desired position in front of said lens opening.

6. A glare shielding device used in connection with a spectacle frame having in combination, a member comprising spaced superposed portions of non-transparent material, means on said frame for rotatably holding said member in a position to overlie a portion of a lens opening in said frame and be spaced from said lens opening, said portions having parallel rectilinear edges whereby said member may be rotated to align said edges to form a sharp line in the field of vision through said lens opening, means carried by said frame for moving said member longitudinally of said frame, said second mentioned means comprising a tubular member secured to said frame longitudinally thereof, a bar movable longitudinally in said tube and supporting said member, and means for adjustably moving said bar longitudinally of said member.

References Cited in the file of this patent

UNITED STATES PATENTS

| | | |
|---|---|---|
| 894,972 | Montbarbon | Aug. 4, 1908 |
| 1,938,085 | Page | Dec. 5, 1933 |
| 2,286,219 | Martinek | June 16, 1942 |

FOREIGN PATENTS

| | | |
|---|---|---|
| 1,040,790 | France | May 27, 1953 |
| 1,044,167 | France | June 17, 1953 |
| 37,550 | Denmark | May 30, 1927 |